United States Patent
Izumi et al.

(10) Patent No.: US 10,102,934 B2
(45) Date of Patent: Oct. 16, 2018

(54) REACTOR STATE MONITORING APPARATUS AND MONITORING METHOD THEREOF

(71) Applicant: Kabushiki Kaisha Toshiba, Minato-ku (JP)

(72) Inventors: Mikio Izumi, Yokohama (JP); Hidehiko Kuroda, Yokohama (JP); Yuka Takada, Minato-ku (JP); Makoto Takemura, Ota-ku (JP); Hiroaki Kenjyo, Fujisawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1150 days.

(21) Appl. No.: 14/367,694

(22) PCT Filed: Dec. 21, 2012

(86) PCT No.: PCT/JP2012/083269
§ 371 (c)(1),
(2) Date: Jun. 20, 2014

(87) PCT Pub. No.: WO2013/094737
PCT Pub. Date: Jun. 27, 2013

(65) Prior Publication Data
US 2015/0036778 A1 Feb. 5, 2015

(30) Foreign Application Priority Data
Dec. 22, 2011 (JP) .................... 2011-281943

(51) Int. Cl.
| G21C 17/035 | (2006.01) |
| G21C 13/02 | (2006.01) |
| G21C 17/10 | (2006.01) |
| G21D 3/04 | (2006.01) |
| G21D 3/06 | (2006.01) |

(52) U.S. Cl.
CPC .......... G21C 17/035 (2013.01); G21C 13/02 (2013.01); G21C 17/10 (2013.01); G21D 3/04 (2013.01); G21D 3/06 (2013.01); *Y02E 30/40* (2013.01)

(58) Field of Classification Search
CPC ................................... G21C 17/035
See application file for complete search history.

(56) References Cited

U.S. PATENT DOCUMENTS 6,615,658 B2 * 9/2003 Snelling ............... G01F 23/247
340/622
2008/0175345 A1 7/2008 Hill et al.
(Continued)

FOREIGN PATENT DOCUMENTS

| DE | 197 41 324 A1 | 3/1999 | |
| DE | 19741324 A1 * | 3/1999 | ........... G01F 23/288 |

(Continued)

OTHER PUBLICATIONS

International Search Report dated Feb. 19, 2013, in PCT/JP12/083269, filed Dec. 21, 2012.
(Continued)

*Primary Examiner* — Jack W Keith
*Assistant Examiner* — Lily C Garner
(74) *Attorney, Agent, or Firm* — Oblon, McClelland, Maier & Neustadt, L.L.P.

(57) ABSTRACT

A reactor state monitoring apparatus including: a first gamma ray-dose measurement device that detects and measures an atmospheric radiation dose caused by radioactive substances on a containment vessel side respective to a biological shielding wall surrounding a pressure vessel and outside the pressure vessel; a second gamma ray-dose measurement device that detects and measures a radiation dose on the pressure vessel side respective to the biological
(Continued)

shielding wall; a fuel radiation measuring device that detects and measures a radiation dose of fuel in the pressure vessel; and a water amount evaluation device that calculates a difference between radiation doses measured by the fuel radiation measuring device and the first gamma ray-dose measurement device as a corrected fuel radiation dose, and acquires a cooling water level as a water level evaluation value, based on the radiation dose measured by the second gamma ray-dose measurement device and the corrected fuel radiation dose.

12 Claims, 8 Drawing Sheets

(56) References Cited

U.S. PATENT DOCUMENTS

2014/0298903 A1* 10/2014 Goto .................. G01F 23/22
73/292

2014/0318237 A1* 10/2014 Kenjyo ................ G21C 17/035
73/292

FOREIGN PATENT DOCUMENTS

| JP | 1-134299 | 9/1989 |
| JP | 8-220284 | 8/1996 |
| JP | 10-39083 | 2/1998 |
| JP | 10-160887 | 6/1998 |
| JP | 2007-64635 A | 3/2007 |

OTHER PUBLICATIONS

Extended European Search Report dated Aug. 19, 2015 in Patent Application No. 12859026.2.

International Preliminary Report on Patentability dated Jun. 24, 2014 in corresponding PCT/JP2012/083269 (English translation only).

Written Opinion dated Feb. 19, 2013 in corresponding PCT/JP2012/083269 (English translation only).

* cited by examiner

| TYPICAL REACTOR OPERATING STATES | GAMMA THERMOMETER (HEATED BY GAMMA RAYS) | GAMMA THERMOMETER (HEATED BY HEATER) | UPPER REACTOR CORE GAMMA RAY DETECTOR |
|---|---|---|---|
| C1: IN A CASE OF OPERATION. THE FUEL IS IN THE COOLING WATER (NORMAL STATE) | LARGE | LARGE | MIDDLE |
| C2: IN A CASE OF OPERATION. THE FUEL IS NOT IN THE COOLING WATER | SMALL | SMALL | LARGE |
| C3: IN A CASE OF SHUTDOWN. THE FUEL IS IN THE COOLING WATER (NORMAL STATE) | SMALL | LARGE | SMALL |
| C4: IN A CASE OF SHUTDOWN. THE FUEL IS NOT IN THE COOLING WATER | SMALL | SMALL | MIDDLE |

FIG. 8

REACTOR STATE MONITORING APPARATUS AND MONITORING METHOD THEREOF

TECHNICAL FIELD

The present invention relates to a reactor state monitoring apparatus that monitors a reactor state, and a monitoring method thereof.

BACKGROUND ART

After a severe accident in nuclear power plants occurs, it is important to grasp a state inside a pressure vessel and a containment vessel so that appropriate measures are taken to control the accident.

Conventionally, the nuclear power plants include a measuring system assumed to be used not only in monitoring at the time of normal operation but also in case of an accident. For example, the measuring system is used for sampling a hydrogen and/or oxygen concentration, sampling radioactivity, and monitoring radiation in a containment vessel, as well as monitoring a fuel damage situation and emission of hydrogen and radioactive substances from the damaged fuel (see, for example, Patent Documents 1 to 3).

To prevent fuel damage, monitoring of a water level is important. For example, boiling water reactors (BWRs) use a differential pressure type level gauge to monitor a water level during normal operation as well as to monitor a fall of the water level to a fuel area (see, for example, Patent Document 4). The differential pressure type level gauge is also used for water level measurement in a suppression chamber which contains cooling water for use in cooling a fuel and the like (see, for example, Patent Document 5).

Ever since the accident in TMI-2 (the Three Mile Island Unit 2) reactor, it has been pursued to reinforce the measuring system to grasp a reactor core cooling situation. For example, pressurized water reactors may have a thermocouple water level monitor attached to an upper portion of a pressure vessel (see, for example, Patent Document 6). Further, ever since the Chernobyl accident in Europe, diversified monitoring methods have been demanded and thereby review of safety measures have been conducted.

Diversification of the water level monitoring is also demanded. For example, water level monitoring by using ultrasonic waves, microwaves, thermocouples, and/or gamma rays outside the reactor is being examined (see, for example, Patent Documents 7 to 10).

In addition, for monitoring the state inside the containment vessel, measurement of flow rates, pressures, air temperatures (ambient temperatures) at various positions, and/or surface temperatures of devices are being performed.

PRIOR ART DOCUMENTS

Patent Document

Patent Document 1: Published Japanese Translation of PCT International Publication for Patent Application No. 2008-522137
Patent Document 2: Publication of Japanese Unexamined Utility Model Application No. HEISEI 1-134299
Patent Document 3: Publication of Japanese Unexamined Patent application No. 2010-48752
Patent Document 4: Publication of Japanese Unexamined Patent Application No. 2007-205912
Patent Document 5: Publication of Japanese Unexamined Patent Application No. 2008-232698
Patent Document 6: Publication of Japanese Unexamined Patent Application No. HEISEI 8-220284
Patent Document 7: Publication of Japanese Unexamined Patent Application No. 2009-271056
Patent Document 8: Publication of Japanese Unexamined Patent Application No. 2010-276593
Patent Document 9: Publication of Japanese Unexamined Patent Application No. 2008-170223
Patent Document 10: Publication of Japanese Unexamined Patent Application No. 2007-64635

SUMMARY OF THE INVENTION

Problems to be Solved by the Invention

With respect to grasping a radiation dose in the containment vessel, assume a case where a fuel is damaged and a containment vessel is filled with rare gases and aerosol gases, such as cesium (Cs)-134, Cs-137, and iodine (I)-131. In this case, conventional apparatuses disclosed in Patent Documents 1 to 3 can detect damage of the fuel. However, the apparatuses of Patent Documents 1 to 3 can only monitor the concentration of gases such as rare gases in the air in the vicinity of a radiation detector. They cannot obtain information that contributes to grasping of a new damage of the fuel and/or the cooling state.

To estimate the position of the fuel after melting of the fuel, measuring a radiation intensity distribution is effective. However, the apparatuses of Patent Documents 1 to 2 are intended to be used for sampling of gases. In the case of the apparatus of Patent Document 3, radiations from the fuel after reactor shutdown are undetectable since radiations, which come from radioactive substances in the atmosphere around an installation position of a detector, become dominant. Accordingly, the apparatuses of Patent Documents 1 to 3 could not be used in estimating progress of the fuel damage situation and the fuel position.

Moreover, conventional technologies could not implement accurate monitoring of a fuel cooling situation.

That is, use of differential pressure type level gauges in Patent Documents 4 and 5 is the most time-proven method for evaluating a mass-converted water level (water amount) of the cooling water in the containment vessel even in the case where a content of the pressure vessel, such as a BWR, is in a boiling state. However, in the differential pressure type level gauges of Patent Documents 4 and 5, water in a reference leg may evaporate in rapid pressure reduction boiling.

The thermocouple type water level measuring device of Patent Document 6, the ultrasonic type water level measuring devices of Patent Documents 7 and 8, and the microwave type water level measuring device of Patent Document 9 are not adapted to directly measure the mass-converted water level.

In short, the principle of the thermocouple type is to measure, with a thermocouple, how much the heat generated by a heater is cooled by peripheral water, and therefore the cooling performance of water is directly monitored. In the BWRs, an upper portion of the fuel has a complicated configuration. Accordingly, a thermocouple type water gauge is inserted to the pressure vessel from a lower side. As a consequence, there is a problem that the thermocouple-type water gauge cannot perform measurement if the fuel falls down to a lower portion of the pressure vessel.

When a reference leg is provided outside the pressure vessel in the ultrasonic type and/or the microwave type measuring device, the water level in the pipe may be lost due to pressure reduction boiling as is the case with the differential pressure type. The ultrasonic type and/or the microwave type measuring devices measure the water level, which is determined by supersonic or microwave characteristics, in accordance with the state of an interface between water and air.

Thus, the measuring system can be diversified by using a plurality of water level measuring methods having different principles, in consideration of their advantages and disadvantages, so that reliability of the measuring system can be enhanced. However, installation of a plurality of water level metering devices causes a huge increase in equipment cost. In other words, to select a combination of devices that can complement each other to secure reliability with use of a simple device configuration has been an issue.

Further, another issue is to clarify a correlation between a plurality of the water gauges having different measurements in various assumable situations, to appropriately identify and exclude a failed device, and to notify an adequate cooling state of the fuel to an operator even after the fuel is damaged in a severe accident.

The present invention has been made to accomplish the above stated issues, and it is an object of the present invention to provide a reactor state monitoring apparatus and a monitoring method thereof, capable of estimating a situation inside a reactor by using a plurality of radiation monitors.

Means for Solving the Problems

In order to accomplish the above-stated issues, a reactor state monitoring apparatus according to the present invention includes: a device of measuring radiation outside shielding that detects and measures a radiation dose in an atmosphere caused by radioactive substances which are on a containment vessel side with respect to a biological shielding wall surrounding a pressure vessel and which are outside the pressure vessel; a device of measuring radiation inside shielding that detects and measures a radiation dose on the pressure vessel side with respect to the biological shielding wall; a fuel radiation measuring device that detects and measures a radiation dose of a fuel contained in the pressure vessel; and a water amount evaluation device that calculates a difference between the radiation dose measured by the fuel radiation measuring device and the radiation dose measured by the device of measuring radiation outside shielding as a corrected fuel radiation dose, and acquires a water level of the cooling water as a water level evaluation value, based on the radiation dose measured by the device of measuring radiation inside shielding with use of the corrected fuel radiation dose.

Advantages of the Invention

According to the reactor state monitoring apparatus and the monitoring method thereof according to the present invention, a state inside a reactor can be estimated by using a plurality of radiation monitors.

DESCRIPTION OF EMBODIMENTS

A reactor state monitoring apparatus and a monitoring method thereof according to the embodiments of the present invention will be described with reference to accompanying drawings. In each of the following embodiments, a case of applying a boiling water reactor to the reactor will be described as an example.

First Embodiment

Figure 1:
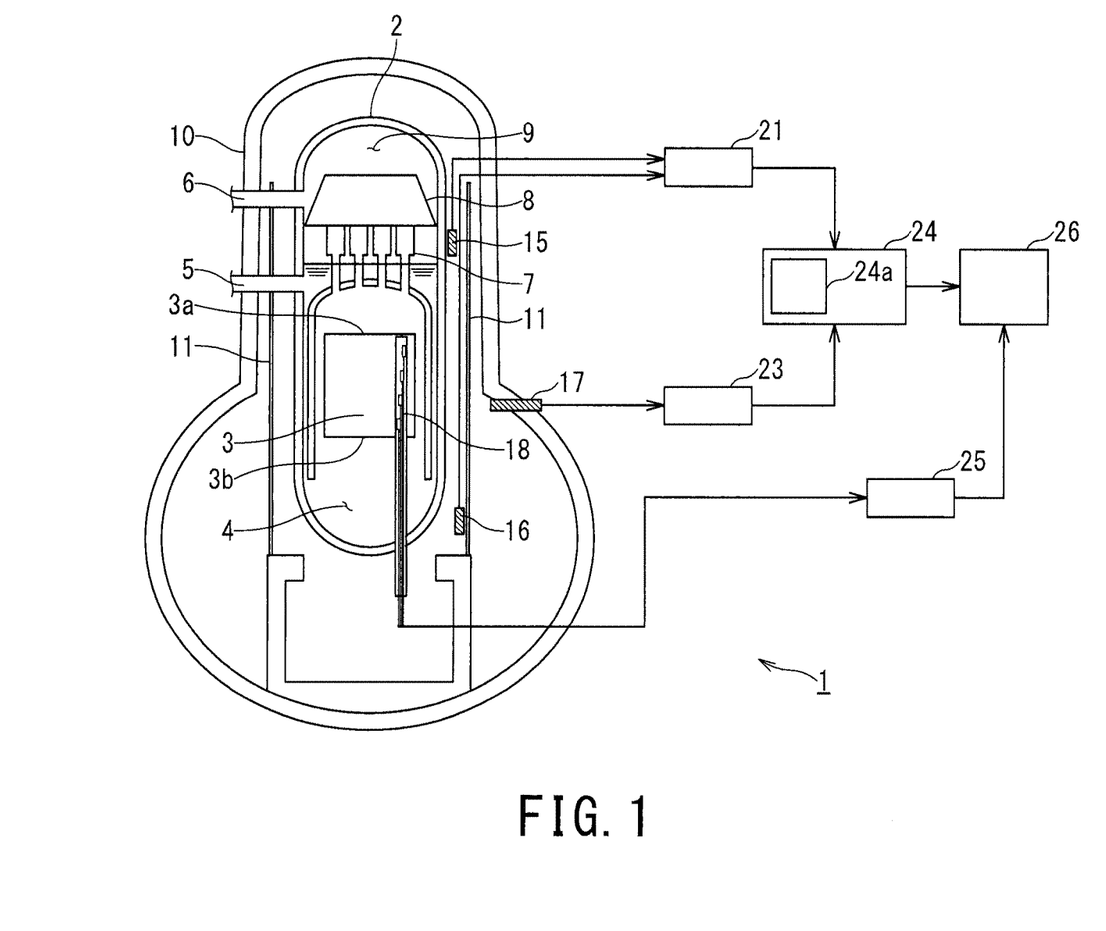
FIG. 1 is a schematic diagram illustrating a reactor state monitoring apparatus according to a first embodiment of the present invention.

FIG. 1 is a schematic diagram of a reactor state monitoring apparatus 1 as one example of a reactor state monitoring apparatus according to the first embodiment of the present invention.

A reactor pressure vessel (hereinafter simply referred to as a "pressure vessel") 2 is a container in a substantially cylindrical shape having a vertical axis direction. The pressure vessel 2 contains a fuel 3 (reactor core) of a reactor. A control rod (not illustrated) that absorbs neutrons can be inserted to and removed from the fuel 3. The control rod is placed so as to go through a lower portion of the pressure vessel 2. The pressure vessel 2 has a supply line 5 that supplies cooling water 4, and a discharge line 6 that removes steam generated in the pressure vessel 2.

After being supplied from the supply line 5, the cooling water 4 flows down through an annular portion which is inside the pressure vessel 2 and is horizontally outside the fuel 3. The cooling water 4 flows to the lower portion of the pressure vessel 2, and flows upward into the fuel 3 through the lower portion of the fuel 3. The cooling water 4 is heated and thereby boiled by the fuel 3, and is separated into steam and moisture by a steam separator 7. Saturated steam 9 dried in a steam drier 8 is discharged from the pressure vessel 2 through the discharge line 6, and drives a steam turbine (not illustrated) to contribute to power generation. After the steam drives the steam turbine, the steam is returned to liquid in a condenser (not illustrated). The liquid is again supplied to the pressure vessel 2 as the cooling water 4 through the supply line 5. The moisture separated in the steam separator 7 flows down through the annular portion outside the fuel 3 together with the cooling water 4 supplied through the supply line 5.

The pressure vessel 2 is enclosed with a reactor containment vessel (hereinafter simply referred to as a "containment vessel") 10. A biological shielding wall 11 is provided between the pressure vessel 2 and the containment vessel 10 so as to surround the pressure vessel 2. The biological shielding wall 11 shields radiation emitted from the fuel 3 at the time of operation and/or shutdown of the reactor.

The containment vessel 10 includes an upper reactor core gamma ray detector 15, a lower reactor core gamma ray detector 16, and an atmosphere gamma ray detector 17. Each of the gamma ray detectors 15 to 17 detects a dose of incoming gamma rays.

The upper reactor core gamma ray detector 15 is provided on the pressure vessel 2 side (inner side) with respect to the biological shielding wall 11, and is provided above an upper end 3a of the fuel 3 (reactor core). The lower reactor core gamma ray detector 16 is provided on the pressure vessel 2 side with respect to the biological shielding wall 11, and is provided below a lower end 3b of the fuel 3.

The atmosphere gamma ray detector 17 is provided on the containment vessel 10 side (outside) with respect to the biological shielding wall 11 to detect a dose of gamma rays in the atmosphere emitted from radioactive substances outside the pressure vessel 2. For example, the atmosphere gamma ray detector 17 detects gamma rays emitted by radioactive substances leaked to the atmosphere of the containment vessel 10 from the pressure vessel 2 due to occurrence of a severe accident.

An output-monitoring detector 18 inserted into the fuel 3 is provided in the pressure vessel 2. The output-monitoring detector (detector) 18 detects a dose of gamma rays from the fuel 3 at the time of operation.

The upper reactor core gamma ray detector 15 and the lower reactor core gamma ray detector 16 are each connected to a reactor core gamma ray measuring device 21. The atmosphere gamma ray detector 17 is connected to an atmosphere gamma ray measuring device 23. Each of the detectors 15 to 17 transmits a detection result to each of the measuring devices 21 and 23. Each of the measuring devices 21 and 23 is connected to a water amount evaluation device 24, so as to transmit acquired measurement results to the water amount evaluation device 24.

The detector 18 is connected to an output monitor 25. The output monitor 25 measures and evaluates the detection result of the detector 18.

The water amount evaluation device 24 and the output monitor 25 display the obtained measurement result on a reactor core state display device 26.

A description is now given of the operation of the reactor state monitoring apparatus 1.

Figure 2:
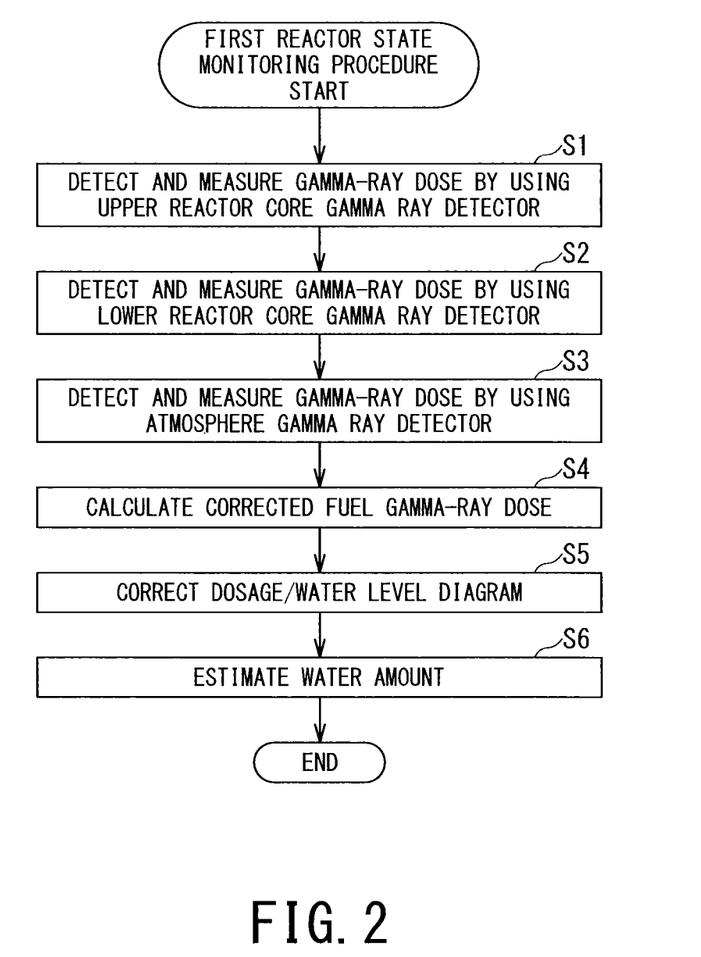
FIG. 2 is a flow chart illustrating processing steps in a monitoring method of a reactor state according to the first embodiment of the present invention.

FIG. 2 is a flow chart illustrating a procedure (first reactor state monitoring procedure) for evaluating a water amount in the pressure vessel 2, which is one of reactor states, by using the reactor state monitoring apparatus 1, the procedure being described as a monitoring method of a reactor state according to the first embodiment of the present invention.

For example, the first reactor state monitoring procedure may be used for evaluating the water amount after the reactor is stopped. The first reactor state monitoring procedure is particularly effective in the case of obtaining the water amount (the mass of cooling water) in the pressure vessel 2 when, for example, the reactor is shut down after occurrence of a severe accident, and radioactive substances are emitted to the atmosphere in the containment vessel 10 due to damage of the fuel 3 and/or the pressure vessel 2.

In step S1, the upper reactor core gamma ray detector 15 detects a gamma-ray dose above the fuel upper end 3a on the pressure vessel 2 side with respect to the biological shielding wall 11. Since the upper reactor core gamma ray detector 15 is placed inside the biological shielding wall 11, the upper reactor core gamma ray detector 15 measures gamma rays generated from the fuel 3 and gamma rays emitted from radioactive substances melted into the cooling water 4. The reactor core gamma ray measuring device 21 (device of measuring radiation inside shielding) measures the gamma-ray dose based on the detection result.

Here, the cooling water 4 mainly includes nuclides of nitrogen (N)-13 and N-16. When the water level is above the fuel upper end 3a, the nuclides in the cooling water 4 mainly contribute to detection values of the upper reactor core gamma ray detector 15. A half value period of N-13 is about 10 minutes, and a half value period of N-16 is about 7 seconds.

Accordingly, gamma rays emitted from N-16 rapidly decline immediately after shutdown of the reactor (in about 7 seconds). The gamma rays emitted from N-13 decline in 10 minutes after shutdown of the reactor.

More specifically, when 10 minutes passes after the shutdown, it is not necessary to take into consideration an influence of the gamma rays generated by the nuclides in the cooling water 4. However, in a period of 10 minutes after the shutdown, it is necessary to take into consideration the influence that the nuclides in the cooling water 4 exert upon the detection result.

Since energy of the gamma rays attributed to pair annihilation of N-13 is 511 keV, the reactor core gamma ray measuring device 21 uses the gamma rays of 511 keV or more, out of the gamma rays detected by the upper reactor core gamma ray detector 15, for measurement. As a consequence, the reactor core gamma ray measuring device 21 can detect a dose of gamma rays generated by the fuel 3, without receiving the influence of the nuclides in the cooling water 4, regardless of the passing time after the shutdown.

In step S2, the lower reactor core gamma ray detector 16 detects a dose of gamma rays below the fuel lower end 3b on the pressure vessel 2 side with respect to the biological shielding wall 11. Since the lower reactor core gamma ray detector 16 is placed inside the biological shielding wall 11, the lower reactor core gamma ray detector 16 measures gamma rays generated from the fuel 3 and gamma rays emitted from radioactive substances melted into the cooling water 4. The reactor core gamma ray measuring device 21 (fuel radiation measuring device) measures a gamma-ray dose based on the detection result. As described above, the reactor core gamma ray measuring device 21 measures the gamma-ray dose in consideration of the influence of the nuclides included in the cooling water 4.

Figure 3:
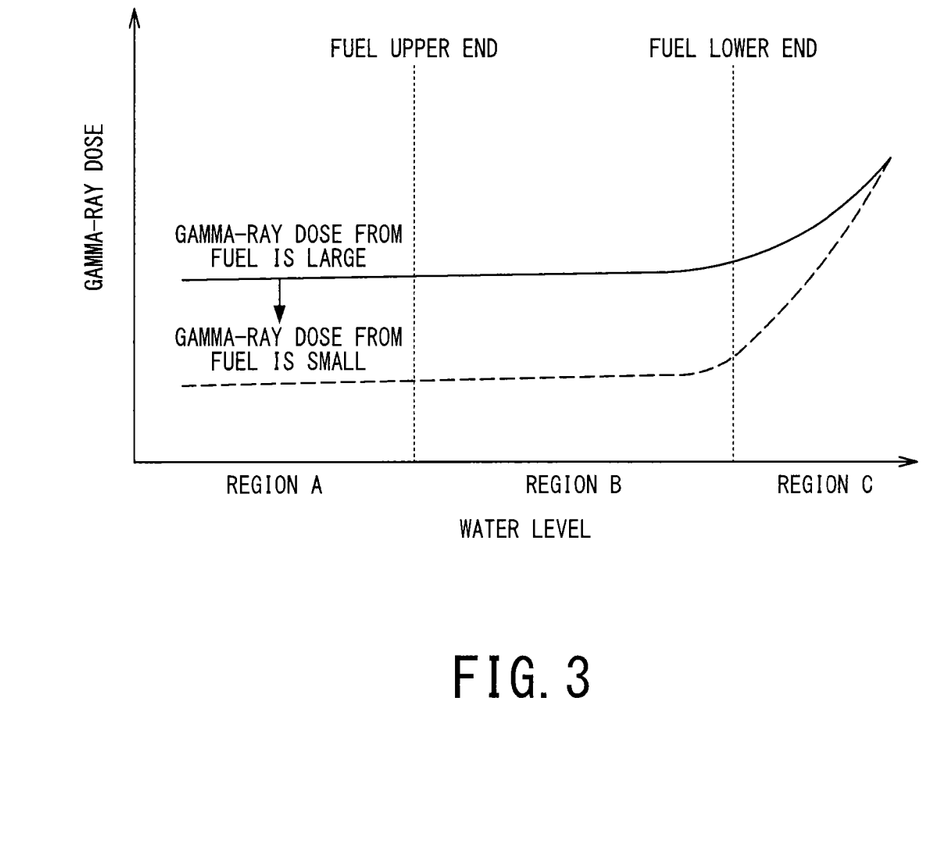
FIG. 3 is a graph view illustrating a relation between water levels (abscissa) of cooling water in a pressure vessel and gamma-ray doses (ordinate) detected by a lower reactor core gamma ray detector.

FIG. 3 is a graph view illustrating a relation between water levels (abscissa) of the cooling water 4 in the pressure vessel 2 and gamma-ray doses (ordinate) detected by the lower reactor core gamma ray detector 16.

The gamma-ray dose detected by the lower reactor core gamma ray detector 16 (reactor core gamma ray measuring device 21) is mostly unchanged when the water level is in the range from the fuel upper end 3a to a position slightly above the fuel lower end 3b. The detection value of the lower reactor core gamma ray detector 16 is dependent on a dose of gamma rays emitted from the fuel 3, that is, an output of the fuel 3. As a consequence, the reactor core gamma ray measuring device 21 may monitor a gamma-ray dose trend, and use a dose of gamma rays emitted from the fuel 3 for evaluation if the obtained gamma-ray dose is flat. More specifically, when the water level is within the range from the fuel upper end 3a to the position slightly above the fuel lower end 3b, the lower reactor core gamma ray detector 16 can detect the gamma-ray dose of the fuel 3.

In step S3, the atmosphere gamma ray detector 17 detects a gamma-ray dose in the atmosphere on the containment vessel 10 side with respect to the biological shielding wall 11. Since the atmosphere gamma ray detector 17 is placed outside the biological shielding wall 11, gamma rays from the fuel 3 are rarely detected in a normal state. Accordingly, the atmosphere gamma ray detector 17 mainly measures gamma rays emitted from the radioactive substances floating in the atmosphere of the containment vessel 10. The atmosphere gamma ray measuring device 23 (device of measuring radiation outside shielding) measures the gamma-ray dose based on the detection result.

In step S4, the water amount evaluation device 24 calculates a difference between the gamma-ray dose detected by the lower reactor core gamma ray detector 16 (reactor core gamma ray measuring device 21) and the gamma-ray dose measured by the atmosphere gamma ray detector 17 (atmosphere gamma ray measuring device 23) as a corrected fuel gamma-ray dose. More specifically, the dose of gamma rays emitted from the fuel 3 measured by the lower reactor core gamma ray detector 16 may include the dose of gamma rays emitted from the radioactive substances floating in the atmosphere of the containment vessel 10. Accordingly, the water amount evaluation device 24 eliminates the dose of gamma rays emitted from the substances floating in the atmosphere of the containment vessel 10 since it may serve as an error cause of the gamma-ray dose from the fuel 3.

In this case, the water amount evaluation device 24 may preferably calculate the corrected fuel gamma-ray dose by using a coefficient that corrects a difference in sensitivity and the like between the atmosphere gamma ray detector 17 and the lower reactor core gamma ray detector 16.

In step S5, the water amount evaluation device 24 corrects a dosage/water level diagram by using the corrected fuel gamma-ray dose and the gamma-ray dose detected by the upper reactor core gamma ray detector 15.

Figure 4:
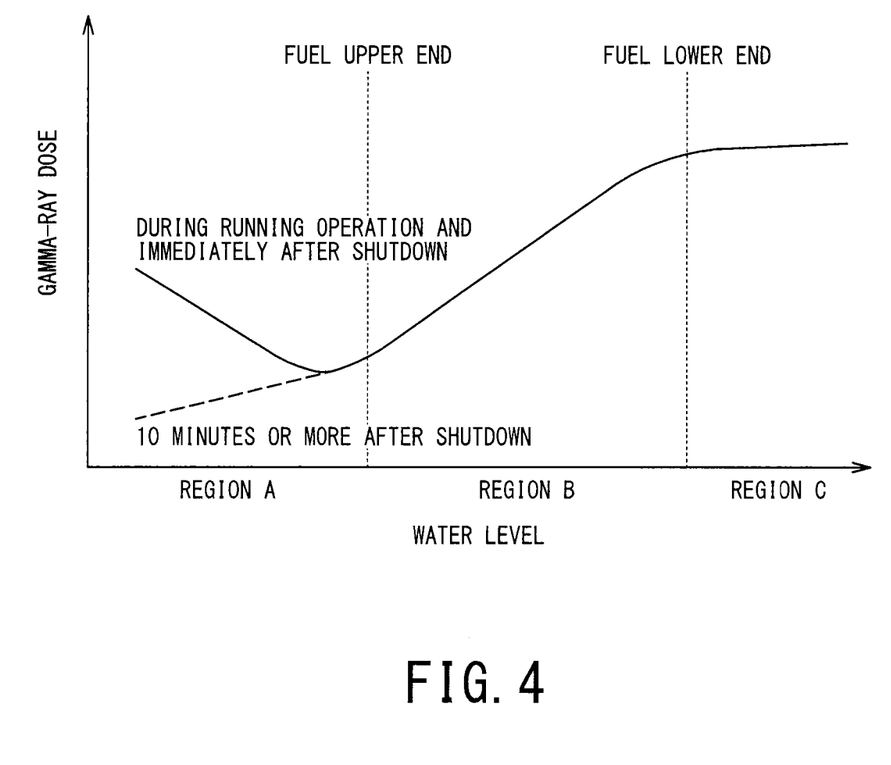
FIG. 4 is a dosage/water level diagram illustrating a relation between gamma-ray doses measured by an upper reactor core gamma ray detector and the water levels of the cooling water.

FIG. 4 is a dosage/water level diagram illustrating a relation between the gamma-ray doses measured by the upper reactor core gamma ray detector 15 and the water levels of the cooling water 4.

For example, the water amount evaluation device 24 incorporates a dosage/water level diagram storage device 24a that stores a dosage/water level diagram obtained in advance by a simulation and the like. The dosage/water level diagram is stored in the storage device 24a. The gamma-ray dose measured by the upper reactor core gamma ray detector 15 draws a curve illustrated in FIG. 4 in accordance with the water levels, when the dose of gamma rays (the output of the fuel 3) emitted from the fuel 3 is unchanged. The water level in the dosage/water level diagram corresponds to the water amount (mass) of the cooling water 4.

Here, a relation between areas A, B, and C illustrated in FIG. 4 and the water levels of the cooling water 4 in the pressure vessel 2 will be described.

Figure 5:
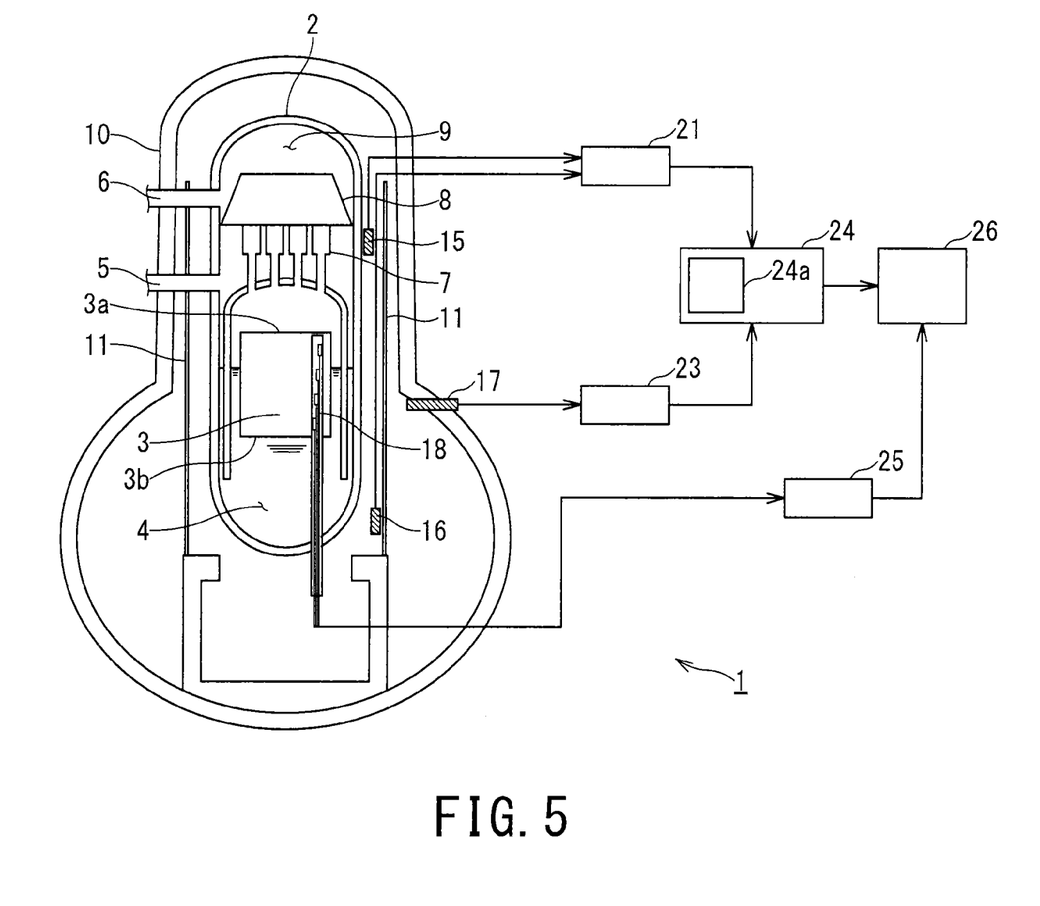
FIG. 5 is an explanatory view illustrating a reactor in the case where the water level of the cooling water is in an area B (FIG. 4).
Figure 6:
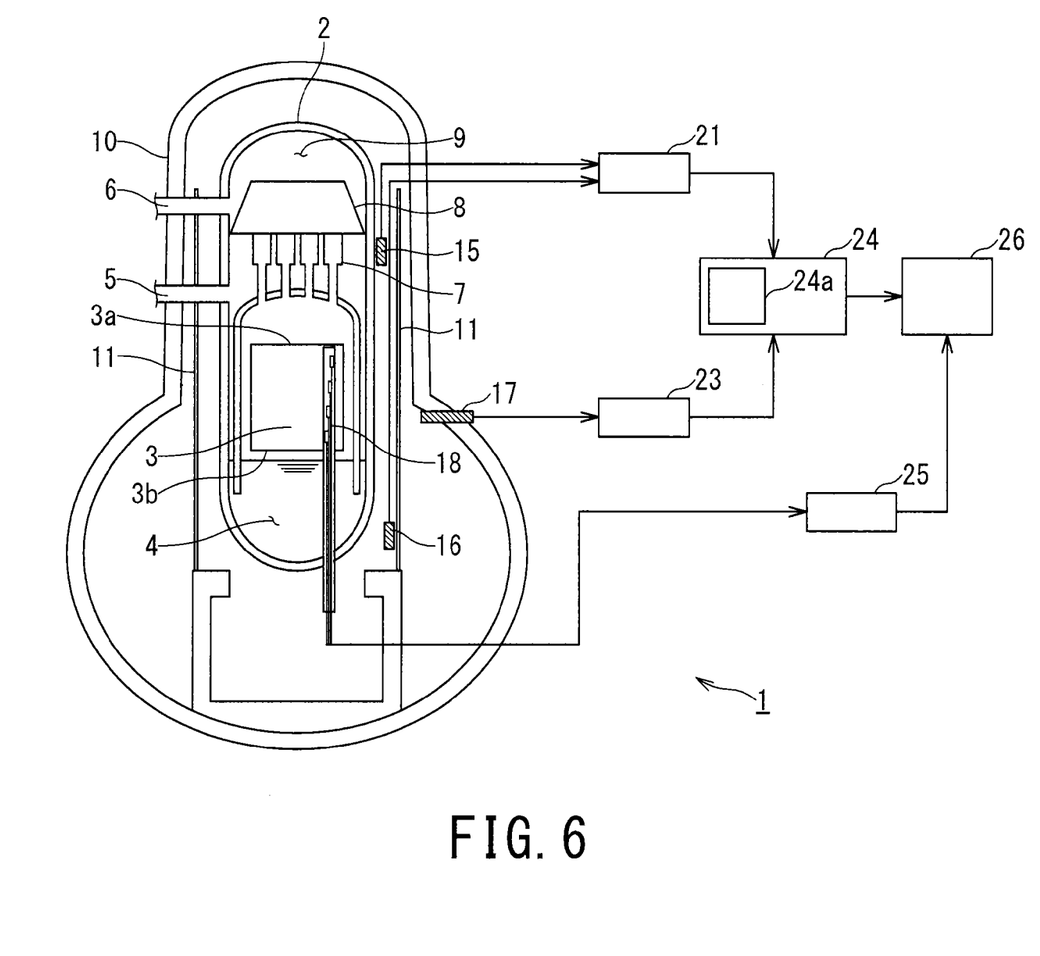
FIG. 6 is an explanatory view illustrating a reactor in the case where the water level of the cooling water is in an area C (FIG. 4).

FIG. 5 is an explanatory view illustrating the reactor in the case where the water level of the cooling water 4 is in the area B of FIG. 4. FIG. 6 is an explanatory view illustrating the reactor in the case where the water level of the cooling water is in the area C of FIG. 4.

The case where the water level of the cooling water 4 is in the area A of FIG. 4 is the case where, for example, the water level of the cooling water 4 is present at a position illustrated in FIG. 1, i.e., above the fuel upper end 3a. The case where the water level of the cooling water 4 is in the area B of FIG. 4 is the case where, for example, the water level of the cooling water 4 is present at a position illustrated in FIG. 5, i.e., in between the fuel upper end 3a and the fuel lower end 3b. The case where the water level of the cooling water 4 is in the area C of FIG. 4 is the case where, for example, the water level of the cooling water 4 is present at a position illustrated in FIG. 6, i.e., below the fuel lower end 3b.

As mentioned above, a gamma-ray dose detected by the upper reactor core gamma ray detector 15 is influenced by the gamma rays emitted from the nuclides included in the cooling water 4 during a period of 10 minutes after the shutdown. Accordingly, during operation and immediately after the shutdown, the gamma-ray dose increases if the water level is above the fuel upper end 3a. Contrary to this, when 10 minutes passes after the shutdown or in the case where only the gamma rays of 511 keV or more are used for measurement, it is not necessary to take into consideration the influence of the gamma rays emitted from the nuclides included in the cooling water 4. Accordingly, when the water level is above the fuel upper end 3a, the gamma rays from the fuel 3 mainly contribute to a measurement value, and the intensity of gamma rays is decreased by the shielding effect of the cooling water 4.

The dosage/water level diagram (FIG. 4) illustrates a transition in the case where a dose of gamma rays emitted by the fuel 3 is constant. More specifically, as the gamma-ray dose changes, a curve in the dosage/water level diagram takes parallel translation or some deformation in a vertical direction with respect to a gamma-ray dose axis.

The water amount evaluation device 24 retains in advance movement amounts of the curve according to the gamma-ray doses of the fuel 3. The water amount evaluation device 24 uses information on the retained movement amounts of the curve according to the gamma-ray doses of the fuel 3 to determine a movement amount of the curve based on the corrected fuel gamma-ray dose calculated in the corrected fuel gamma-ray dose calculating step (step S4), and corrects the dosage/water level diagram (step S5).

In step S6, the water amount evaluation device 24 estimates the water amount of the cooling water 4 in the pressure vessel 2. Based on the corrected dosage/water level diagram, the water amount evaluation device 24 estimates the water level (water amount) of the cooling water 4 corresponding to the gamma-ray dose measured by the upper reactor core gamma ray detector 15.

As a consequence, the reactor state monitoring apparatus 1 can estimate the cooling water amount (mass) based on the dosage/water level diagram. Based on a positional relationship thereof, the reactor state monitoring apparatus 1 can evaluate the mass-converted water level.

A measurement value of the output monitor 25 based on the output of the detector 18 may be used as the dose of gamma rays from the fuel 3. At the time of operation, the output monitor 25 may measure a gamma-ray dose based on the output of the output-monitoring detector 18. At the time when the reactor is stopped, a gamma-ray dose of the fuel 3 can be obtained by evaluating the gamma-ray dose, based on historical data during operation that is stored in the output monitor 25, and by predicting and correcting chronic attenuation of the evaluated gamma-ray dose.

Thus, the reactor state monitoring apparatus 1 includes a gamma ray measuring device 23 as the device of measuring radiation outside shielding, a gamma ray measuring device 21 as the device of measuring radiation inside shielding and the fuel radiation measuring device, and a water amount evaluation device 24.

The gamma ray measuring device 23 measures a dose of gamma rays in the atmosphere caused by radioactive substances which are on the containment vessel 10 side with respect to the biological shielding wall 11 surrounding the pressure vessel 2 and which are outside the pressure vessel 2, based on the gamma-ray dose detected by the atmosphere gamma ray detector 17.

The gamma ray measuring device 21 measures a gamma-ray dose on the pressure vessel 2 side with respect to the biological shielding wall 11, based on the doses of gamma rays detected by the upper reactor core gamma ray detector 15 and the lower reactor core gamma ray detector 16. The gamma ray measuring device 21 measures a dose of gamma rays of the fuel 3 in the case where the water level is in the range between the fuel upper end 3a and the fuel lower end 3b, based on the gamma-ray dose detected by the lower reactor core gamma ray detector 16.

The water amount evaluation device 24 calculates a difference between the gamma-ray dose measured by the gamma ray measuring device 21 and the gamma-ray dose measured by the gamma ray measuring device 23 as a corrected fuel gamma-ray dose. With use of the corrected fuel gamma-ray dose, the water amount evaluation device 24 acquires the water level of the cooling water 4 as a water level evaluation value.

The reactor state monitoring apparatus 1 and the monitoring method of the reactor state using the reactor state monitoring apparatus 1 as described above can eliminate the dose of gamma rays emitted from the radioactive substances floating in the containment vessel 10 at the time of water level evaluation. Accordingly, even when radioactive substances are leaked out to the containment vessel 10 from the pressure vessel 2 at the time when, for example, the reactor is stopped due to a severe accident, the reactor state monitoring apparatus 1 can eliminate the influence of the gamma rays emitted from the radioactive substances floating in the atmosphere, and can monitor the water level of the cooling water 4 with more precision.

In the first embodiment, an example of evaluating the water level of the cooling water 4 with use of the dosage/water level diagram has been described. However, the water level may be evaluated by other methods as long as the dose of gamma rays emitted from the fuel 3 in consideration of the gamma-ray dose in the atmosphere of the containment vessel 10 is used.

An example of the reactor state monitoring apparatus 1 has been described in which the storage device (dosage/water level diagram storage device 24a) that stores the dosage/water level diagram is incorporated in the water amount evaluation device 24. However, the storage device may be placed in any positions as long as the dosage/water level diagram can be read out. For example, the dosage/water level diagram may be stored in a storage device placed outside the water amount evaluation device 24 and the like.

Second Embodiment

A reactor state monitoring apparatus and a monitoring method thereof according to a second embodiment of the present invention will be described.

Figure 7:
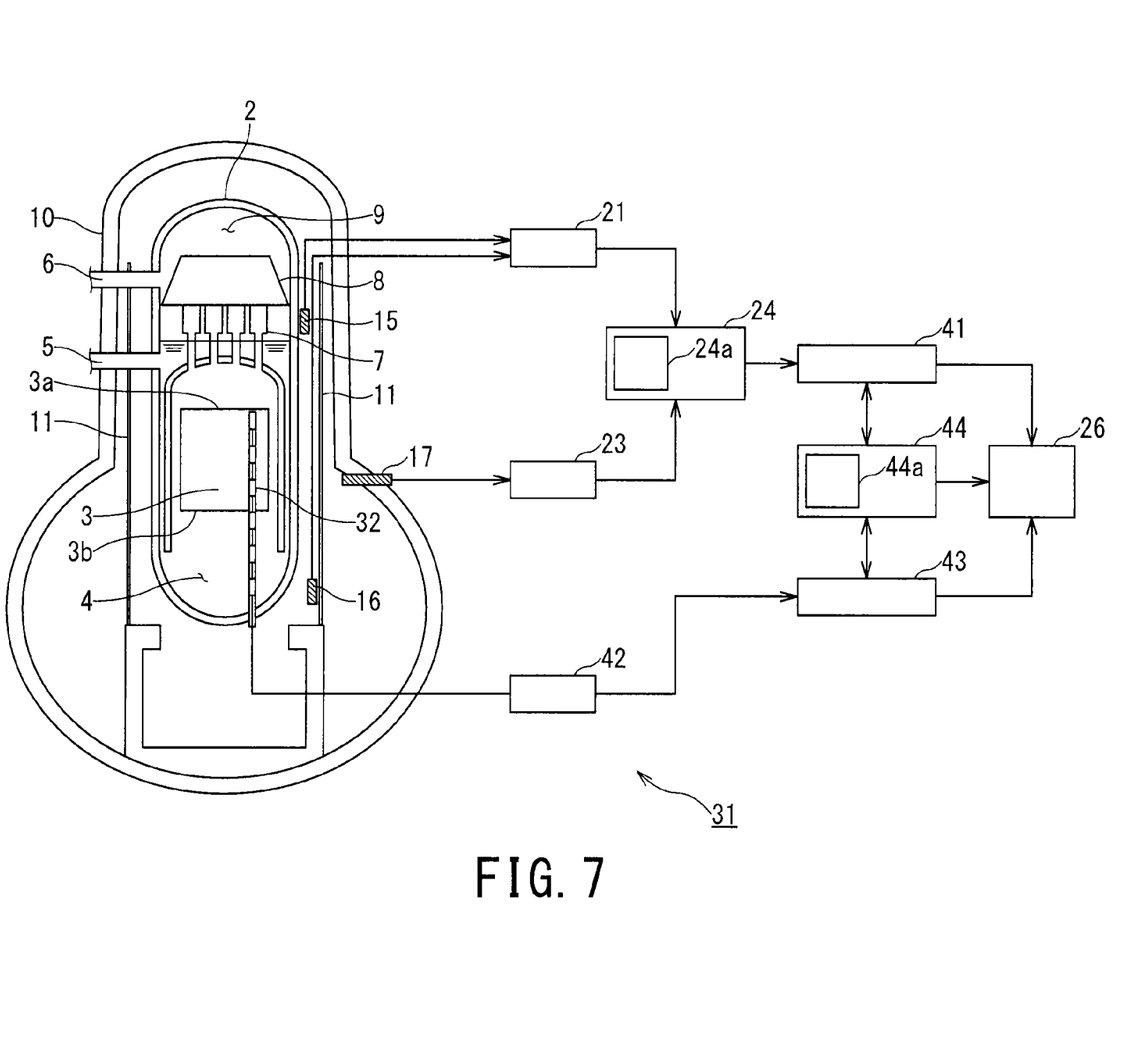
FIG. 7 is a schematic diagram illustrating a reactor state monitoring apparatus according to a second embodiment of the present invention.

FIG. 7 is a schematic diagram of a reactor state monitoring apparatus 31 as one example of a reactor state monitoring apparatus according to the second embodiment of the present invention.

A main difference between the reactor state monitoring apparatus 31 and the reactor state monitoring apparatus 1 is that the reactor state is monitored by using measurement results of a gamma thermometer 32 which functions as a thermocouple water gauge in the fuel 3 (reactor core). In the following description, constitutions and portions corresponding to those of the reactor state monitoring apparatus 1 are designated by identical reference characters to omit a redundant description thereof.

For example, the reactor state monitoring apparatus 31 includes a gamma ray measuring device 23 used as the device of measuring radiation outside shielding, a gamma ray measuring device 21 used as the device of measuring radiation inside shielding and the fuel radiation measuring device, and a water amount evaluation device 24. The reactor state monitoring apparatus 31 further includes a water amount transition history storage device 41, a reactor core cooling performance evaluation device 42, a reactor core cooling performance storage device 43, and a reactor state estimation device 44.

The water amount transition history storage device 41 records water amount evaluations (see first embodiment) obtained from the water amount evaluation device 24.

The gamma thermometer 32 mainly has an exothermic body, a thermocouple, and a heater. The exothermic body has a heat insulation portion and a non-heat insulation portion. The exothermic body generates heat with the gamma rays emitted from the fuel 3. When the gamma-ray dose is low, the exothermic body corrects a sensor output with heat of the heater which imitates the heat generated by the gamma rays. The thermocouple detects a gamma-ray dose by measuring a difference in temperature between the heat insulation portion and the non-heat insulation portion. More specifically, the gamma thermometer 32 monitors reactor power based on the gamma-ray dose. The gamma thermometer 32 is provided at a plurality of places along a vertical direction of the pressure vessel 2, from the fuel upper end 3a to the vicinity of a bottom portion of the pressure vessel 2.

Detection results of the gamma thermometers 32 are inputted into the reactor core cooling performance evaluation device 42. The reactor core cooling performance evaluation device 42 evaluates reactor core cooling performance based on the detection results. More specifically, the reactor core cooling performance evaluation device 42 evaluates whether the circumference is filled with the cooling water 4 or steam, by using a difference in cooling performance between the cooling water 4 and the steam. The reactor core cooling performance storage device 43 stores the evaluation results obtained from the reactor core cooling performance evaluation device 42.

The reactor state estimation device 44 estimates and evaluates the state inside the pressure vessel 2 based on the information stored in the water amount transition history storage device 41 and the reactor core cooling performance storage device 43. The reactor state estimation device 44 displays an obtained evaluation result on the reactor core state display device 26.

The above-stated reactor state monitoring apparatus 31 includes the water amount transition history storage device 41 and the reactor core cooling performance storage device 43 which are independent of each other. However, the reactor state monitoring apparatus 31 may arbitrarily be configured as long as the information stored in each of the storage devices 41 and 43 can be read out. For example, both the storage devices 41 and 43 may be formed as one device. They may be configured so as to be integrated with other storage devices (such as the dosage/water level diagram storage device 24a incorporated in the water amount evaluation device 24). Contrary to this configuration, the water amount transition history storage device 41 and the like may be divided into a plurality of entities.

A description is now given of the operation of the reactor state monitoring apparatus 31.

As described before, the gamma thermometer 32 uses the heat generated by the gamma rays emitted from the fuel 3 in one case, and uses the heat generated by the heater in another case.

Figure 8:
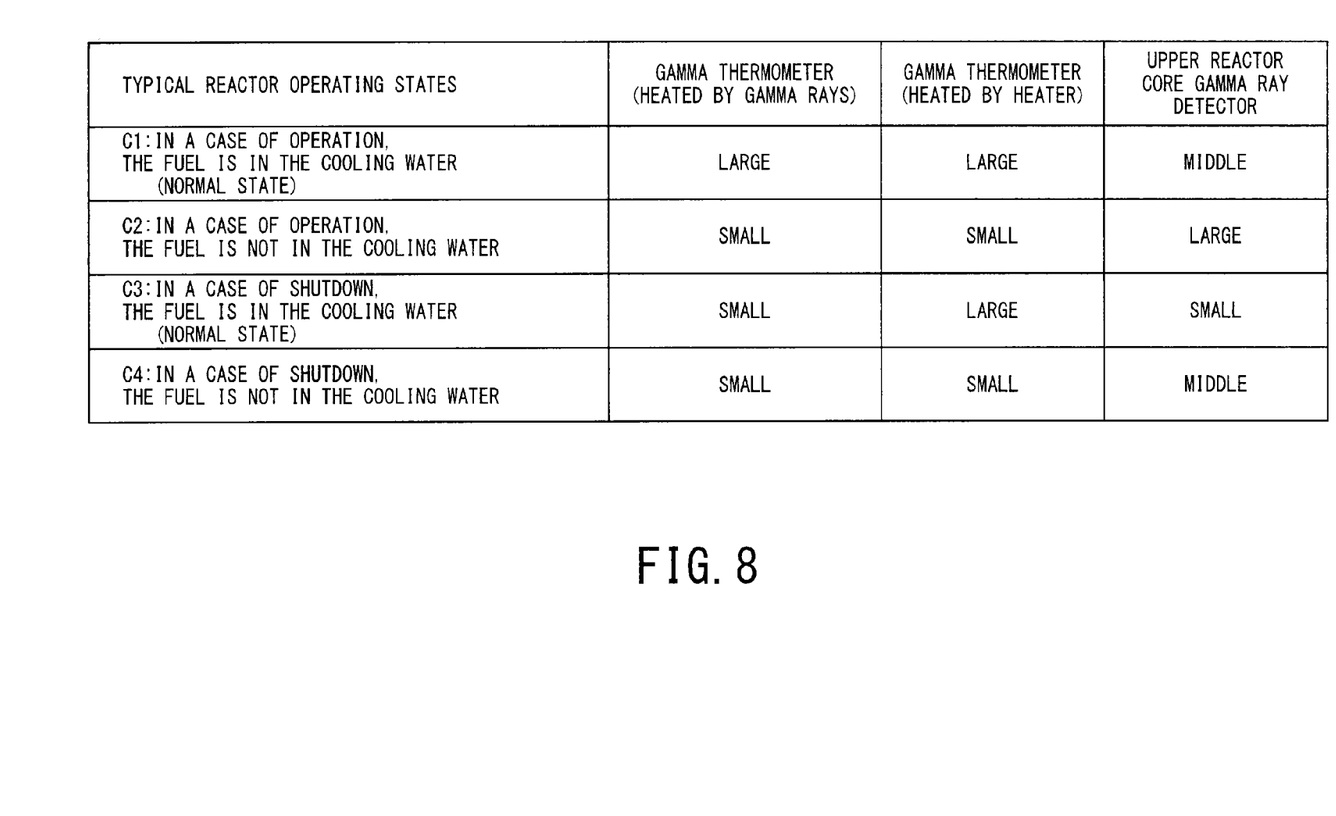
FIG. 8 is a table view in which detection results of the thermocouple water gauges detected based on gamma rays or heat of a heater are each made to correspond to a relation between typical reactor operating states and water levels of the cooling water.

FIG. 8 is a table view in which detection results of the thermocouple water gauges detected based on gamma rays or heat of the heater are each made to correspond to a relation between typical reactor operating states and water levels of the cooling water 4. An output "large" of the gamma thermometer 32 indicates that a temperature difference is 10 degrees or more. In other words, when the gamma thermometer 32 is heated by a heat source and is cooled by the cooling water 4, the output "large" is indicated. An output "small" indicates that the temperature difference is smaller than 10 degrees. In other words, when the gamma thermometer 32 is not heated by the heat source or the gamma thermometer 32 is not cooled by the cooling water 4, the output "small" is indicated.

As illustrated in FIG. 8, the temperature difference measured by the thermocouple changes depending on whether the gamma thermometer 32 is heated by the heat from the gamma rays or the heater.

Specifically, in the case of output operation in a normal state (state C1 in FIG. 8) where the fuel (the fuel upper end 3a to the fuel lower end 3b) is in the cooling water 4 and the gamma thermometer 32 is heated by either the gamma rays or the heater, the output "large" is indicated in either case. In the case of output operation in a state (state C2 in FIG. 8) where the water level is lower than the fuel (below the fuel lower end 3b) and the gamma thermometer 32 is heated by either the gamma rays or the heater, the output "small" is indicated in either case.

In the case of shutdown in a normal state (state C3 in FIG. 8) where the fuel is in the cooling water 4 and the gamma thermometer 32 is heated by the gamma rays, the output "small" is indicated. In the case where the gamma thermometer 32 is heated by the heater, the output "large" is indicated. In the case of shutdown in a state (state C4 in FIG. 8) where the fuel 3 is not in the cooling water 4 and the gamma thermometer 32 is heated by either the gamma rays or the heater, the output "small" is indicated. The state of "shutdown" is assumed to be a subcritical state achieved by inserting a control rod into the fuel 3.

As illustrated in FIG. 8, the doses of gamma rays measured by the upper reactor core gamma ray detector 15 are made to correspond to the relation between the operating states of the reactor and the water levels. The gamma-ray dose obtained by the upper reactor core gamma ray detector 15 (reactor core gamma ray measuring device 21) changes to an output "large", an output "middle" and an output "small" in accordance with the states C1 to C4. The level of the dose is set by, for example, equally dividing gamma-ray doses in the corrected dosage/water level diagram described in the first embodiment into three subdivisions and assigning an output "large", an output "middle" and an output "small" to these subdivisions in a descending order of the gamma-ray dose.

The reactor state estimation device 44 incorporates an operating state/output relation storage device 44a that prestores a correspondence table (table) in which outputs of the gamma thermometer 32 are made to correspond to outputs of the upper reactor core gamma ray detector 15 in accordance with the reactor states. One example of the table is a correspondence table illustrated in FIG. 8. The correspondence table is stored in the storage device 44a. The reactor state estimation device 44 acquires the information stored in the water amount transition history storage device 41 and the reactor core cooling performance storage device 43, and estimates and evaluates the state inside the pressure vessel 2 while referring to the table.

In the case of an example illustrated in FIG. 8, the output of the gamma thermometer 32 is "small" regardless of ON/OFF of the heater if the reactor core is in the state C2 or the state C4 in which the water level of the cooling water 4 is below the fuel lower end 3b for example. However, the output of the upper reactor core gamma ray detector 15 becomes "large" or "middle" depending on whether the reactor core is in output operation or in a shutdown state. By referring to the outputs of the upper reactor core gamma ray detector 15, the reactor state estimation device 44 can evaluate the reactor state which cannot be determined if only the gamma thermometer 32 is provided.

Here, determination of the water level by the gamma thermometer 32 is performed by using a difference in cooling performance that cools the exothermic body, the difference being attributed to the presence or absence of the cooling water 4. Therefore, if the cooling performance by the cooling water 4 can be secured, the water level is determined regardless of whether or not the cooling water is in the state of a gas-liquid two-phase flow. In other words, the reactor core cooling performance evaluation device 42 obtains an evaluation which may contradict an actual water amount of the cooling water (mass of the cooling water 4) 4 depending on a transition state of water and steam. In the case of the water amount evaluation device 24, determination by the water amount evaluation device 24 is dependent on the water amount in between the fuel 3 and the upper reactor core gamma ray detector 15 unless the position of the fuel 3 changes. Accordingly, the water amount evaluation device 24 determines a mass-converted water level which is independent of the state of a two-phase flow.

Therefore, the reactor state estimation device 44 can evaluate a transition width (a vertical width of the pressure vessel 2) of the two-phase flow based on a difference between the water levels evaluated by the water amount evaluation device 24 and the reactor core cooling performance evaluation device 42. Specifically, since a plurality of gamma thermometers 32 are provided along the vertical direction of the pressure vessel 2, the reactor core cooling performance evaluation device 42 can determine whether the circumference is filled with the cooling water 4 or steam at a plurality of places. As a consequence, the reactor state monitoring apparatus 31 can grasp the cooling state around the fuel 3 with more precision.

By providing the upper reactor core gamma ray detector 15, the lower reactor core gamma ray detector 16, and the gamma thermometer 32, a melting state and a falling state of the reactor core can also be ascertained. For example, when the fuel 3 falls down to a lower portion of the pressure vessel 2 due to the melting of the fuel 3, the reactor state estimation device 44 acquires the water level from the reactor core cooling performance storage device 43. The reactor state estimation device 44 acquires detection results of the upper reactor core gamma ray detector 15 and the lower reactor core gamma ray detector 16 from the water amount transition history storage device 41.

When the fuel 3 melts, the position of the fuel 3 moves downward. As a result, a gamma-ray dose by the lower reactor core gamma ray detector 16 increases, so that a ratio of intensity between the upper reactor core gamma ray detector 15 and the lower reactor core gamma ray detector 16 changes. The reactor state estimation device 44 can grasp the melting state and the falling state of the fuel 3 by using the water level obtained by the gamma thermometer 32 and the change in the ratio of intensity.

Further, when the fuel 3 falls down to the lower portion of the pressure vessel 2, it can be assumed that a signal extraction unit of the gamma thermometer 32 provided on the bottom portion of the pressure vessel 2 also melts and fails. When failures occur, it can also be assumed that a short-circuited thermocouple causes output errors of the gamma thermometer 32, which results in incorrect water level measurements.

However, outputs of the water amount evaluation device 24 based on the detection results of the upper reactor core gamma ray detector 15 are stored in the water amount transition history storage device 41. Outputs of the reactor core cooling performance evaluation device 42 are stored in the reactor core cooling performance storage device 43. The reactor state estimation device 44 evaluates a transition of the state by using the historical data stored in each of these storage devices 41 and 43, so that the transition of the state of the fuel 3 (presence or absence of fuel melting, etc.), and/or failure of the gamma thermometer 32 can be estimated.

When it is determined that the fuel is melting, the reactor state estimation device 44 estimates the reactor core state (water level, fuel position, dose of radiation from the fuel 3, etc.) without using the output of the gamma thermometer 32 which may possibly be failed. This makes it possible to secure reliability of the estimation result of the state inside the reactor, such as the water level.

According to the reactor state monitoring apparatus 31 and the monitoring method thereof in the second embodiment, a detailed reactor state can be monitored by using both the evaluation of cooling performance as obtained in the gamma thermometer 32 and the evaluation by mass conversion of the cooling water 4 with the gamma rays as obtained in the gamma ray detectors 15 to 17. The reactor state monitoring apparatus 31 can appropriately provide the cooling performance of the fuel 3 to an operator.

More specifically, the reactor state monitoring apparatus 31 can monitor the state of two-phase flow transition in the pressure vessel 2 and the state of the reactor, and can determine the change in position of the fuel 3 caused by melting, and failure of the measuring system. As a result, the reactor state monitoring apparatus 31 can monitor the reactor state in more detail and with more precision. In the reactor state monitoring apparatus 31, the measuring devices can properly complement each other and can appropriately determine and eliminate a failed device.

In a nuclear power plant already provided with the gamma thermometer 32 and the gamma ray detectors 15 to 17, a more detailed reactor state can be monitored by using existing measuring system without additionally providing a special measuring system. As a result, the reactor state monitoring apparatus 31 can be made with a simple apparatus configuration.

Although some embodiments of the present invention were described, these embodiments are in all respects illustrative and are not considered as the basis for restrictive interpretation. These new embodiments can be performed in other various forms, and various kinds of removals, replacements and modifications are possible without departing from the meaning of the present invention. These embodiments and their modifications are intended to be embraced in the range and meaning of the present invention, and are particularly intended to be embraced in the invention disclosed in the range of the claims and the equivalency thereof.

For example, a neutron detector may be used in place of the gamma ray detectors 15 to 17. Since a dose of neutrons emitted from the radioactive substances in the cooling water 4 is small, it becomes possible to reduce the above-stated influence of the nuclides in the cooling water 4.

The numbers of the gamma ray detectors 15 to 17 and the gamma thermometers 32 are not limited to those specified in the embodiment, but may properly be set in accordance with detection accuracy and/or detecting places.

REFERENCE NUMERALS

1—reactor state monitoring apparatus
2—reactor pressure vessel (pressure vessel)
3—fuel
10—reactor containment vessel (containment vessel)
11—biological shielding wall
15—upper reactor core gamma ray detector
16—lower reactor core gamma ray detector
17—atmosphere gamma ray detector
18—output-monitoring detector (detector)
21—reactor core gamma ray measuring device
23—atmosphere gamma ray measuring device
24—water amount evaluation device
25—output monitor
26—reactor core state display device
31—reactor state monitoring apparatus
32—gamma thermometer
41—water amount transition history storage device
42—reactor core cooling performance evaluation device
43—reactor core cooling performance storage device
44—reactor state estimation device

The invention claimed is:

1. A reactor state monitoring apparatus comprising:
a pressure vessel;
a biological shielding wall at least partially surrounding the pressure vessel;
a containment vessel surrounding the biological shielding wall;
a first radiation measuring device configured to detect and measure a gamma radiation dose in an atmosphere which is located in between the containment vessel and the biological shielding wall;
a second radiation measuring device configured to detect and measure a gamma radiation dose in between the pressure vessel and the biological shielding wall;
a third radiation measuring device located in between the pressure vessel and the biological shielding wall and configured to detect and measure a gamma radiation dose of a fuel contained in the pressure vessel;
a dosage/water level diagram storage memory configured to store a dosage/water level diagram indicating a relation between measurement values of the second radiation measuring device and water levels corresponding to water amounts of a cooling water in the pressure vessel; and
a water amount evaluation device configured to:
calculate a difference between the gamma radiation dose measured by the first radiation measuring device and the gamma radiation dose measured by the third radiation measuring device as a corrected fuel radiation dose, then
read out the dosage/water level diagram from the dosage/water level diagram storage memory, then
correct the read dosage/water level diagram with use of the corrected fuel radiation dose, and then acquire a water level of the cooling water corresponding to the radiation dose measured by the second radiation measuring device based on the corrected dosage/water level diagram as a water level evaluation value.

2. The reactor state monitoring apparatus according to claim 1, wherein the second radiation measuring device is configured to detect the radiation at least above an upper end of the fuel, and the third radiation measuring device is configured to detect a radiation dose at least below a lower end of the fuel.

3. The reactor state monitoring apparatus according to claim 1, wherein the second radiation measuring device and the third radiation measuring device are configured to detect a gamma-ray dose of 511 keV or more.

4. The reactor state monitoring apparatus according to claim 1, further comprising:
   a thermocouple water gauge provided inside the pressure vessel and having a heater;
   an operating state/output relation storage memory configured to store a correspondence table in which outputs of the thermocouple water gauge detected by the thermocouple water gauge based on radiation or heat of the heater are each made to correspond to a relation between operating states of the reactor and the water levels, and in which outputs of the second radiation measuring device are made to correspond to a relation between the operating states of the reactor and the water levels; and
   a state estimation device configured to evaluate an operating state of the reactor based on the correspondence table read out from the operating state/output relation storage memory, an output of the thermocouple water gauge, and an output of the second radiation measuring device.

5. The reactor state monitoring apparatus according to claim 4, wherein the thermocouple water gauge is provided in a plurality of places along a vertical direction of the pressure vessel, and the state estimation device configured to estimate a height-direction range of a gas-liquid two-phase flow in the pressure vessel based on a plurality of outputs of the thermocouple water gauges and the water level evaluation value.

6. The reactor state monitoring apparatus according to claim 1, further comprising:
   a thermocouple water gauge provided in the pressure vessel and configured to detect a water level in the pressure vessel; and
   a state estimation device configured to estimate a position of the fuel based on the water level detected by the thermocouple water gauge and an output ratio of the second radiation measuring device and the third radiation measuring device,
   wherein the second radiation measuring device is configured to detect the radiation at least above an upper end of the fuel, and the third radiation measuring device is configured to detect a radiation dose at least below a lower end of the fuel.

7. The reactor state monitoring apparatus according to claim 1, further comprising:
   a thermocouple water gauge provided in the pressure vessel and configured to detect a water level in the pressure vessel;
   a first storage memory configured to store an output of the thermocouple water gauge;
   a second storage memory configured to store the water level evaluation value; and
   a state estimation device configured to estimate a reactor state based on history information on the reactor states stored in the first storage memory and the second storage memory.

8. The reactor state monitoring apparatus according to claim 7, wherein the reactor state is at least one of a state whether the fuel is melted or not, and a state whether the thermocouple water gauge is broken down or not.

9. The reactor state monitoring apparatus according to claim 1,
   wherein the second radiation measuring device is configured to detect the radiation at least above an upper end of the fuel, and the third radiation measuring device is configured to detect a radiation dose at least below a lower end of the fuel, and
   wherein the second radiation measuring device and the third radiation measuring device are configured to detect a gamma-ray dose of 511 keV or more.

10. The reactor state monitoring apparatus according to claim 9, further comprising:
    a thermocouple water gauge provided inside the pressure vessel and having a heater;
    an operating state/output relation storage memory configured to store a correspondence table in which outputs of the thermocouple water gauge detected by the thermocouple water gauge based on radiation or heat of the heater are each made to correspond to a relation between operating states of the reactor and the water levels, and in which outputs of the second radiation measuring device are made to correspond to a relation between the operating states of the reactor and the water levels; and
    a state estimation device configured to evaluate an operating state of the reactor based on the correspondence table read out from the operating state/output relation storage memory, an output of the thermocouple water gauge, and an output of the second radiation measuring device.

11. The reactor state monitoring apparatus according to claim 1, further comprising:
    a thermocouple water gauge provided inside the pressure vessel and having a heater;
    an operating state/output relation storage memory configured to store a correspondence table in which outputs of the thermocouple water gauge detected by the thermocouple water gauge based on radiation or heat of the heater are each made to correspond to a relation between operating states of the reactor and the water levels, and in which outputs of the second radiation measuring device are made to correspond to a relation between the operating states of the reactor and the water levels; and
    a state estimation device configured to evaluate an operating state of the reactor based on the correspondence table read out from the operating state/output relation storage memory, an output of the thermocouple water gauge, and an output of the second radiation measuring device,
    wherein the second radiation measuring device is configured to detect the radiation at least above an upper end of the fuel, and the third radiation measuring device is configured to detect a radiation dose at least below a lower end of the fuel.

12. The reactor state monitoring apparatus according to claim 1, further comprising:
    a thermocouple water gauge provided inside the pressure vessel and having a heater;

an operating state/output relation storage memory configured to store a correspondence table in which outputs of the thermocouple water gauge detected by the thermocouple water gauge based on radiation or heat of the heater are each made to correspond to a relation between operating states of the reactor and the water levels, and in which outputs of the second radiation measuring device are made to correspond to a relation between the operating states of the reactor and the water levels; and a state estimation device configured to evaluate an operating state of the reactor based on the correspondence table read out from the operating state/output relation storage memory, an output of the thermocouple water gauge, and an output of the second radiation measuring device, wherein the second radiation measuring device and the third radiation measuring device are configured to detect a gamma-ray dose of 511 keV or more.

* * * * *